(12) United States Patent
Campbell

(10) Patent No.: US 10,167,928 B2
(45) Date of Patent: Jan. 1, 2019

(54) INSPECTABLE SYNTHETIC TENSILE MEMBER ASSEMBLY

(71) Applicant: Richard V. Campbell, Tallahassee, FL (US)

(72) Inventor: Richard V. Campbell, Tallahassee, FL (US)

(73) Assignee: Bright Technologies, L.L.C., Havana, FL (US)

( * ) Notice: Subject to any disclaimer, the term of this patent is extended or adjusted under 35 U.S.C. 154(b) by 94 days.

(21) Appl. No.: 13/894,463

(22) Filed: May 15, 2013

(65) Prior Publication Data
US 2014/0338168 A1 Nov. 20, 2014

(51) Int. Cl.
*F16G 11/02* (2006.01)

(52) U.S. Cl.
CPC ....... *F16G 11/025* (2013.01); *Y10T 29/49817* (2015.01)

(58) Field of Classification Search
CPC .......... F16G 11/00; F16G 11/03; F16G 11/12; F16G 11/02; F16G 11/025; Y10T 29/49817; Y10T 29/49815; Y10T 403/5781; Y10T 403/5773; Y10T 403/503; Y10T 403/5766
USPC ............................................................ 14/22
See application file for complete search history.

(56) References Cited

U.S. PATENT DOCUMENTS

| | | | | | |
|---|---|---|---|---|---|
| 3,573,346 | A | * | 4/1971 | Appleby | D07B 1/147 174/71 R |
| 5,134,675 | A | * | 7/1992 | Poli | G02B 6/381 385/56 |
| 6,623,173 | B1 | * | 9/2003 | Grois | G02B 6/3878 385/76 |
| 7,121,732 | B2 | * | 10/2006 | Pimpinella | G02B 6/4471 385/53 |
| 7,664,363 | B1 | * | 2/2010 | Mowery, Sr. | G02B 6/3887 385/137 |
| 2012/0305312 | A1 | * | 12/2012 | McCullough | F16G 11/02 174/75 R |

* cited by examiner

*Primary Examiner* — Christopher Besler
(74) *Attorney, Agent, or Firm* — J. Wiley Horton

(57) ABSTRACT

A protected synthetic tensile member assembly including one or more fixed terminations used to transmit a tensile load from the tensile member to an external component. The tensile member includes access for inspection of its constituent fibers in at least one selected inspection region. The region is selected on the basis of the area of interest to the tensile member's use—such as the area of greatest stress concentration or the area of greatest abrasion. A removable cover is provided for the inspection region. A user may selectively remove this cover in order to gain access to the inspection region.

14 Claims, 15 Drawing Sheets

INSPECTABLE SYNTHETIC TENSILE MEMBER ASSEMBLY

CROSS-REFERENCES TO RELATED APPLICATIONS

This non-provisional patent application claims the benefit, pursuant to 37 C.F.R. section 1.53(c), of an earlier-filed provisional patent application. The earlier application was assigned Ser. No. 61/647,059, filed on May 15, 2012. It listed the same inventor.

STATEMENT REGARDING FEDERALLY SPONSORED RESEARCH OR DEVELOPMENT

Not Applicable.

MICROFICHE APPENDIX

Not Applicable member

BACKGROUND OF THE INVENTION

1. Field of the Invention

This invention relates to the field of load-carrying tensile members. More specifically, the invention comprises a synthetic tensile member assembly designed to permit easy inspection of defined regions in which high stress, high wear, or other significant conditions are expected to occur.

2. Description of the Related Art

Prior art tensile members are often made of steel wire. The diameter of each wire is significantly less than the diameter of the tensile member as a whole. The wires are formed into a cohesive unit by varying known processes, with helical wrapping being one good example. In order for the tensile member to transmit a tensile load, one or more terminations must be added. The word "termination" shall mean an assembly on a portion of the tensile member that allows a load-transmitting device to be attached to the tensile member. Such terminations are most often attached to the ends of a tensile member but they may also be placed on an intermediate point in some cases.

A termination is most often created by attaching a rigid loading fixture to the end of a tensile member in order to provide a consistent and reliable interface between the often-flexible components of the tensile member and external components. The loading fixture may be one solid piece or may be an assembly of two or more pieces. A simple prior art example is a closed Spelter socket. A Spelter socket is typically a metal casting or forging that includes a loading eye and an expanding cavity. The steel wires proximate the end of the tensile member are placed within the cavity and then splayed apart. The cavity is then filled with a potting compound. The term "potting compound" means any composition that transitions from a liquid to a solid over time. As one example, the potting compound may be lead. Molten lead is poured into the cavity (with the splayed wires present) and the lead then cools and solidifies. As a second example, the potting compound may be a two-part epoxy. The two parts are mixed together and then placed in the cavity. The two parts then cross-link and solidify.

Once the potting compound solidifies, the end of the steel wire tensile member is locked to the Spelter socket and a termination is thereby created. In this example, the "termination" includes the Spelter socket (including the loading eye and cavity), the length of strands potted into the cavity, and the potting compound that has solidified in the cavity. The loading eye may be attached to some external object and the tensile member may then be used to transmit tension. Spelter sockets are made with many different types of loading features, including a tang or clevis with a transverse hole.

In some examples, the rigid loading fixture may be split into two pieces. The first piece contains the cavity used for potting. This piece is usually called an "anchor." The second piece attaches to the anchor and includes a feature for transmitting a load—such as a loading eye. As an example, the anchor might include an external thread. The loading eye would then include an internal thread designed to engage the external thread on the anchor.

As those skilled in the art will know, many other types of terminations exist. As another example, a wire tensile member can be wrapped around a metal thimble and woven or clamped back on itself. The middle of the thimble then forms an "eye" through which a pin may be passed to secure the termination to an external object. In still another example, the tensile member may be woven around a hollow transverse tube. The hollow tube then receives a transverse pin. In all these examples, the termination provides a rigid and consistent load-transference point for the tensile member. In other words, the point at which a load is to be transferred to the tensile member is clearly defined. Further, the fibers that are actually connected to the load-transference point are held in a consistently defined state (They are locked into the termination in a consistent and repeatable way). Such a termination is defined as a "fixed termination." This is to be contrasted with some other prior art tensile members such as slings that are made of a continuous loop of material. Such continuous-loop slings may be loaded at an infinite number of points (such as by passing a given point of the sling around a transverse pin). The present invention applies to fixed terminations.

Tensile members are often used in "critical" applications where the failure of the tensile member could have catastrophic results. One good example would be a tensile member used as a "stay" in a crane. The portions of the tensile member lying outside the terminations are often subjected to abrasion forces, cutting forces, ultraviolet radiation, corrosion, debris infiltration, and other degrading phenomena. A tensile member will of course not remain in service forever. It must be inspected and periodically replaced. A long-established inspection regimen exists for steel wire tensile members used in critical applications. The outer wires of each tensile member bundle are visually accessible.

One well-known criterion simply counts the number of broken wires that are visible on a tensile member's exterior and uses this as a pass/fail criterion. While somewhat crude, this approach has been found to be effective for the prior art steel wire tensile members.

It is now known to replace the steel wires in a prior art tensile member with high-strength synthetic fibers. Examples include KEVLAR, VECTRAN, DYNEEMA, TECHNORA, SPECTRA, POLYESTER, NYLON, GLASS, CARBON, and ZYLON. The individual components of a steel tensile member are most commonly referred to as "wires" while the individual components of a tensile member made of synthetic materials are most commonly referred to as "fibers" or "filaments." For consistency in this disclosure, the term "fibers" will be used for the synthetic components.

Pound-for-pound, synthetic tensile members have the potential to be much stronger than steel tensile members. They offer other advantages as well—such as corrosion resistance and easier handling. However, some characteristics of synthetic fibers are less desirable. Synthetic fibers have a very small diameter, on the order of a human hair, making it very difficult to inspect large sections. Synthetic fibers are also much softer than steel, making them more prone to snag and tear. They are also more susceptible to heat damage, debris infiltration, abrasion damage, ultraviolet degradation, and cutting damage. Thus, in many applications it is desirable to protect any exposed synthetic fibers in a tough external jacket.

The term "jacket" should be understood to include any type of protective covering for a collection of synthetic fibers. It most commonly refers to a covering for a bundle of strands passing between two terminations, but it may also encompass some or all of the terminations themselves. A jacket may be applied via an extrusion process, such as extruding a NYLON plastic jacket over a core of synthetic fibers. A jacket may also be added by dipping, spraying, wrapping, or braiding. A jacket may include any material or combination of materials.

The term jacket is by no means limited to the particular method of application. Any material which protects the synthetic fibers could be considered a jacket. Because many tensile members are flexible, it may be desirable for the jacket material to be flexible. A flexible cable wrapped around a winch drum is one example.

However, other tensile members need not be flexible at all. For instance, a stay used in a crane often remains in one position at all times. It simply transmits a tensile load between two points. In that instance, the jacket may be a piece of hollow steel tubing. A core of synthetic strands is passed through the hollow steel tubing and secured to a termination on each end. When tension is removed from such an assembly, it does not go slack because of the relative stiffness of the jacket material. However, as the primary purpose of the assembly is still to carry tension, it is properly referred to as a "tensile member."

FIGS. 1 and 2 show the prior art approach of encasing the synthetic fibers in a surrounding jacket. In FIG. 1, termination 22 is created by attaching anchor 18 to tensile member 20. FIG. 2 shows a section view through the completed assembly. Fibers 26 are placed in expanding passage 30 through anchor 18. They are then potted in place to create potted region 32. Attachment fixture 36 is connected to anchor 18 using threaded coupling 34.

Jacket 24 is provided over the exterior of synthetic fibers 26. It preferably extends a short distance into anchor 18. In the embodiment shown, the jacket is received within jacket receiver 28. Thus, no portion of the synthetic fibers is exposed to the outside world.

Jacket 24 is preferably made of a tough material able to withstand normal use within the intended environment. A common example of a jacket is an extruded layer of NYLON or HDPE covering the exterior of the synthetic fiber core. The jacket and the rigid terminations in this example are able to withstand abrasive forces, cutting forces, and ultraviolet radiation. In more extreme examples, the jacket may include a woven metal reinforcement layer. Of course, as explained previously, the jacket may even be a solid metal tube. In any event, a primary objective of the jacket is to ameliorate most of the durability problems associated with using synthetic fibers.

However, the reader will also appreciate that the jacket interferes with the vital inspection function. In the example of FIGS. 1 and 2, there is no way for an inspector to look at the fibers contained within the jacket. This lack of "inspectability" has become a deterrent to the use of protected synthetic tensile members in critical applications.

In fact, the prior art approach has often been to use the synthetic fibers in an unprotected (unjacketed) state. The relatively delicate fibers are left exposed to the elements so that they can be inspected. This exposure introduces concerns regarding predictability and overall reliability. Such tensile members may break down gradually due to frictional wear, ultraviolet degradation, debris infiltration, chemical infiltration, etc. For example, when a tensile member made of synthetic fibers is dragged around the deck of a vessel, some fibers will be damaged. However, this wear is not objectively quantifiable. The only way to determine the strength reduction is to actually test the cable to destruction.

One prior art approach has been to weave a continuous "sling" of synthetic fibers. The sling is then surrounded by a loose bag that provides some degree of protection. However, the sling typically has no fixed and rigid loading points (It has no fixed terminations). Such slings are intended to be passed around particular objects (such as a pin having a minimum diameter) or connected to general rigging hardware. However, a user encountering such as sling has no idea whether it has been used incorrectly in the past. The flexible bag encasing the core fibers may in fact be concealing many broken or damaged fibers. Inconsistencies in the hardware the sling is connected to create many potential unknowns. The lack of environmental control creates issues with fiber inspection due to the fact that there is no defined region of interest.

While prior art tension members using synthetic fibers have many known performance advantages, they do not tend to wear in a controlled and predictable fashion when exposed to the environment in which they are used. They ideally need to be protected from environmental elements. However, they also need to be "inspectable" to gain and retain the confidence of the community that uses them.

The present invention solves this problem by provided an inspection region in a protected synthetic tensile member assembly having controlled anchor points. The inspection region selectively provides access to critical areas so that an inspector may view the fibers in these critical areas.

BRIEF SUMMARY OF THE PRESENT INVENTION

The present invention comprises a protected synthetic tensile member assembly including one or more fixed terminations used to transmit a tensile load from the tensile member to an external component. The tensile member includes access for inspection of its constituent fibers in at least one selected inspection region. The region is selected on the basis of the area of interest to the tensile member's use—such as the area of greatest stress concentration or the area of greatest abrasion. A removable cover is provided for the inspection region. A user may selectively remove this cover in order to gain access to the inspection region.

Figure 1:
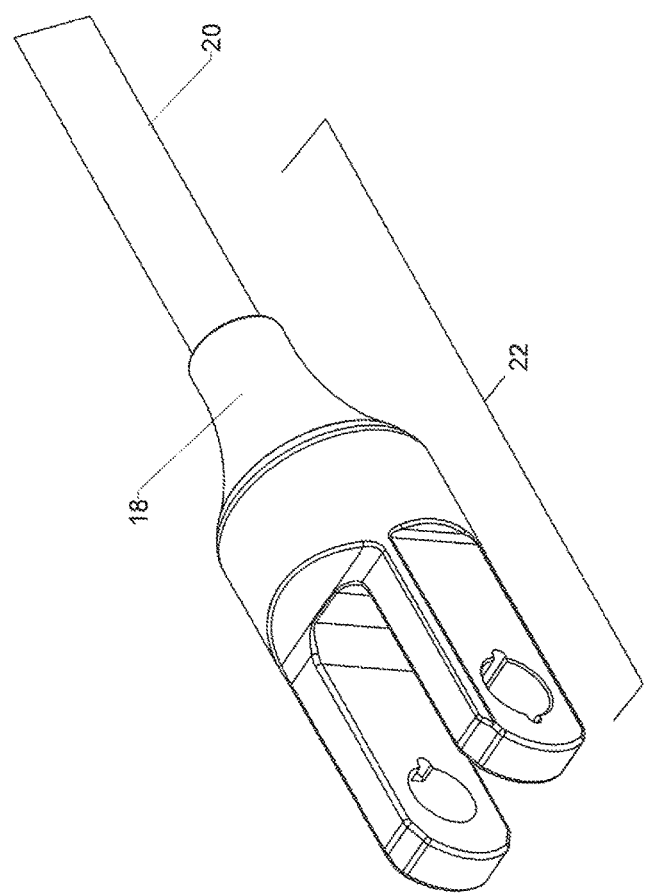
FIG. 1 is a perspective view, showing a prior art tensile member.
Figure 2:
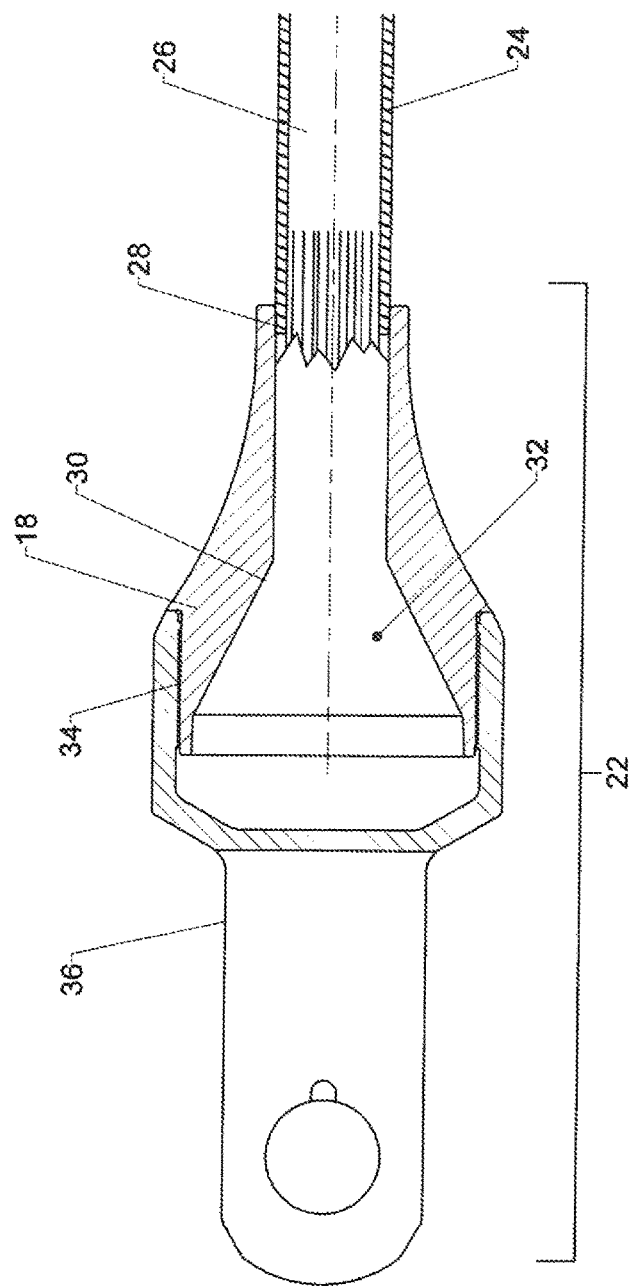
FIG. 2 is a sectional elevation view, showing the assembly of FIG. 1.

| REFERENCE NUMERALS IN THE DRAWINGS | |
|---|---|
| 18 anchor | 20 tensile member |
| 22 termination | 24 jacket |
| 26 fibers | 28 jacket receiver |
| 30 expanding passage | 32 potted region |
| 34 threaded coupling | 36 attachment fixture |
| 38 removable cover half | 40 removable cover half |
| 42 cap screw | 44 receiver |
| 46 jacket ring | 48 anchor ring |
| 50 access hole | 52 inspection region |
| 54 anchor ring receiver | 56 jacket ring receiver |
| 58 anchor opening | 60 tensile member opening |
| 62 transparent sling | 64 threaded cover |
| 66 shoulder | 68 threaded engagement |
| 70 cover | 72 access port |
| 74 alignment marking | 76 outer layer |
| 78 inner layer | 80 wound sling |
| 82 stirrup | 84 tension member |
| 86 casement | 88 cover |
| 90 strap | 92 snap |
| 94 receiver | 96 pin receiver |
| 98 first flange | 100 second flange |
| 102 threaded boss | 104 thimble |
| 106 neck anchor portion | 108 distal anchor portion |
| 110 threaded engagement | |

DETAILED DESCRIPTION OF THE INVENTION

Synthetic tensile member assemblies are used in a wide variety of applications, each of which imposes differing operating constraints. The operating constraints of a particular tensile member will often determine the areas of interest for inspection. For instance, a tensile member that is carrying a relatively static tensile load with potted terminations (such as a crane boom pendant) often has the greatest stress concentration and bending fatigue at the point where the freely flexing fibers in the tensile member join the potted region in the anchor (the "potting interface"). The fibers will generally start to break in this location when the tensile member begins to fail. Thus, it is advisable to define an "inspection region" for such a tensile member in the vicinity of the potting interface.

On the other hand, another tensile member might pass over a pulley near its mid point. That point might then warrant inspection and it would make sense to define an "inspection region" near the tensile member's midpoint. In general, the present invention operates by:

(1) Providing a synthetic tensile member that is protected by a jacket;

(2) Providing the synthetic tensile member with at least one pre-defined load-transference point (a fixed termination) that defines a consistent and controlled point where a load is transferred from the synthetic tensile member to some external object;

(3) Defining one or more inspection regions where a user wishes to be able to examine the fibers of the tensile member (either visually or by other means); and (4) providing a removable cover that selectively covers the defined inspection region(s).

When in place, the removable cover preferably provides suitable protection for the fibers it covers. It is also desirable for the removable cover to be removable and replaceable multiple times over the useful life of the tensile member (though an individual cover may need to be replaced by a new cover). These objectives may be achieved using a wide variety of physical components. In the following paragraphs, detailed descriptions are provided for some of the invention's embodiments.

Figure 3:
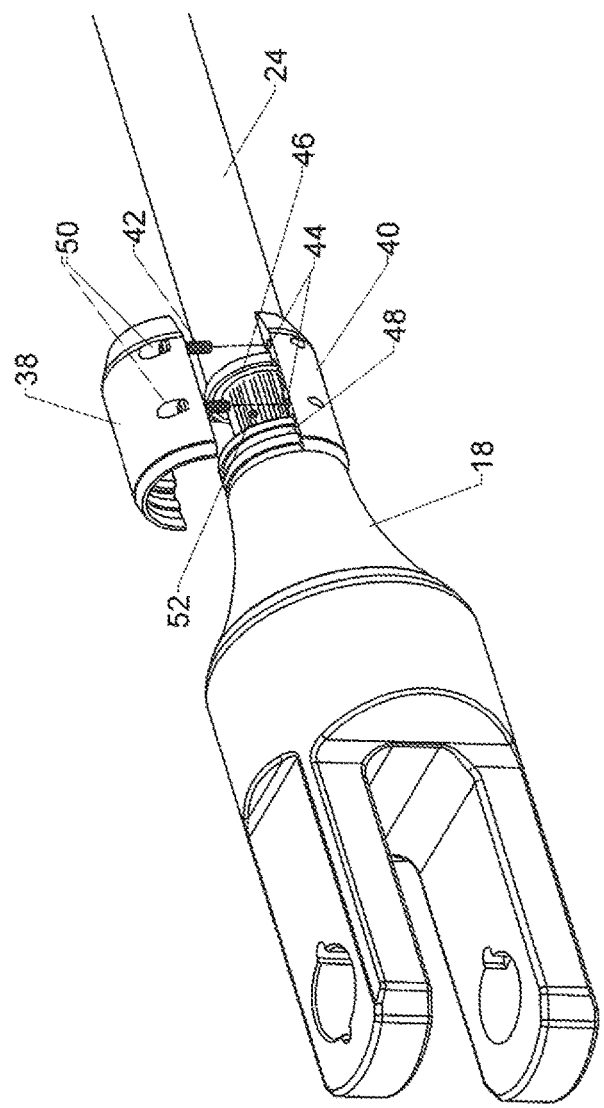
FIG. 3 is an exploded perspective view, showing an embodiment of the present invention.
Figure 4:
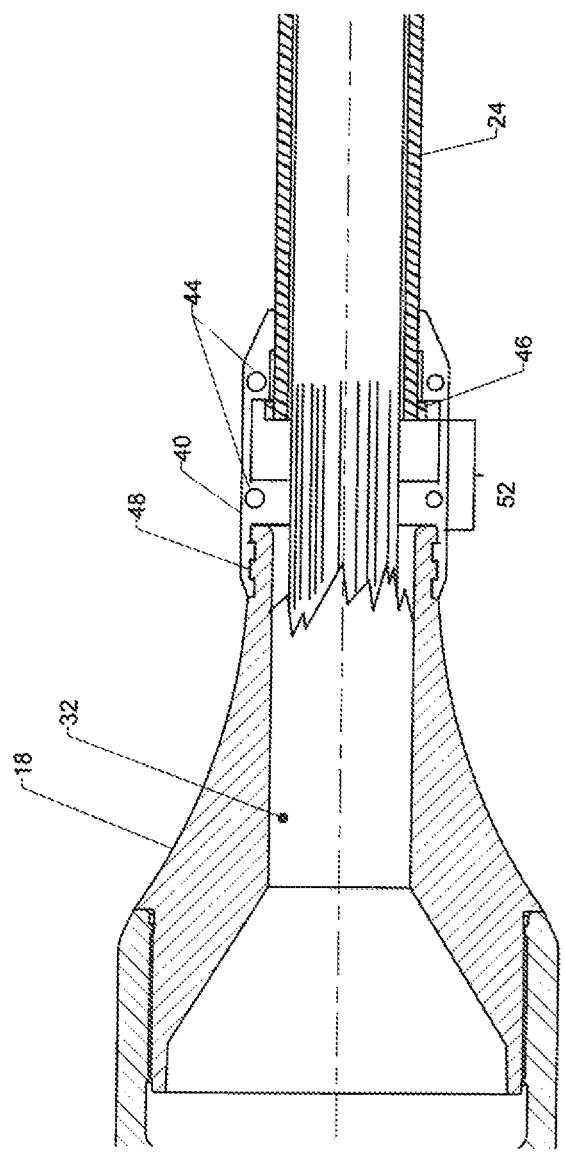
FIG. 4 is a sectional elevation view, showing the assembly of FIG. 3.
Figure 5:
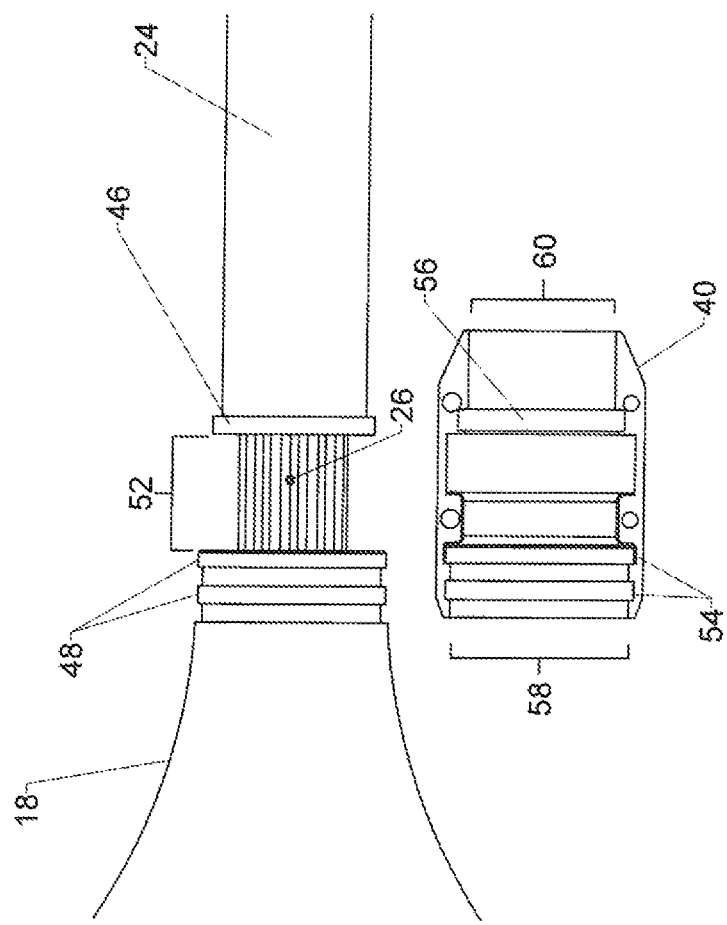
FIG. 5 is an elevation view, showing some details of the assembly of FIG. 3.

FIGS. 3-5 disclose the first embodiment of the present invention. FIG. 3 shows how jacket 24 stops short of anchor 18 in this version, leaving a length of exposed synthetic fibers therebetween. The length of exposed fibers is the "inspection region" for this embodiment. In this embodiment the removable cover is split into two halves 38, 40. These may be joined together by any suitable means. In the example shown, six cap screws are fed through access holes 50 on one of the removable halves and then threaded into threaded receivers 44 on the other half. Each access hole includes a countersunk shoulder for the head of the cap screw to bear against and draw the two halves tightly together.

It is important to protect the interior fibers from harmful exposures during use. Therefore, in this embodiment, a positive lock is provided between the cover and the jacket. This may be done using many different features, such as a long clamping surface, or a series of interlocking features. One could also include one or more sealing O-rings. One could also introduce an injected sealing compound—such as a curable silicone—before clamping the two cover halves together.

In the example of FIG. 3, anchor 18 is equipped with one or more anchor rings 48. Likewise jacket 24 may include an integral or separate jacket ring 46. The two removable cover halves include annular recesses that are sized to receive and engage the anchor rings and jacket ring.

FIG. 4 shows a sectional view through the assembly of FIG. 3 with one of the two removable cover halves still in place. Inspection region 52 in this embodiment is the annular region between the end of the jacket and the start of the anchor. For a tensile loading—especially with some flexure—the area of maximum stress concentration will often occur near the interface between potted region 32 and the freely flexing fibers within the balance of the tensile member.

Another area where inspection may be desired is the point at which the fibers exit the rigid anchor. Mild flexing will often occur at this point, producing fatigue. Thus, when the tensile member is overloaded or has experienced too much cyclic bending, the fibers in one of these regions will tend to break down before the balance of the fibers in the tensile member. Inspection region 52 allows visualization of the fibers proximate the potted region interface.

FIG. 5 is a non-sectional view showing one of the cover halves lying next to the tensile member assembly. Removable cover half 40 in this example includes:

(1) anchor opening 58 sized to admit anchor 18;

(2) anchor ring receivers 54 sized to receive and engage anchor rings 48;

(3) jacket ring receiver 56 sized to receive and engage jacket ring 46; and (4) tensile member opening 60 sized to admit jacket 24.

Jacket ring 46 may be forms by depositing additional material over jacket 24. It may also be formed by ultrasonically deforming the end portion of the jacket to create a "bead." In still other instances the jacket ring may be a separate piece that is joined to the balance of the jacket by an adhesive or by simple friction. In some instances, however, it may be preferable to omit jacket ring 46 altogether. In that case, the interior of the removable covers may simply incorporate gripping features—such as a knurled surface or annular ring recesses—configured to "bite" into the jacket. Other gripping features may also be substituted for the interface between the removable cover half and the anchor. A connection between the cover and the jacket may also be created using a separate adhesive.

For purposes of this invention, it is only important that the jacket be held in place with a reasonable seal in order to prevent the ingress of unwanted factors based on the particular application. The unwanted factors could be UV light, chemicals, dirt, or other identified factors. The jacket, and its interface with the tension member, its interface with the termination(s), and its interface with any removable cover should be designed to provide an appropriate level of durability for the intended use.

Figure 6:
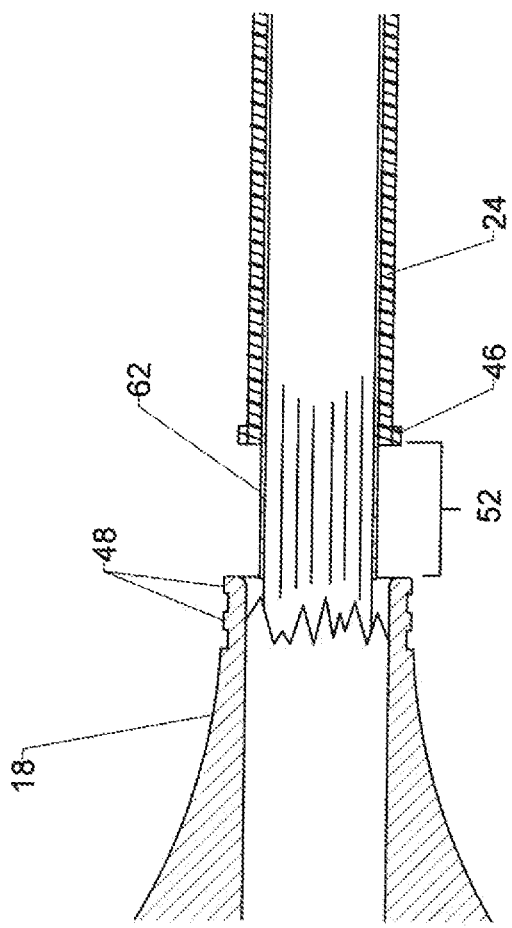
FIG. 6 is a sectional elevation view, showing an additional embodiment of the invention.

FIG. 6 shows a variation on the embodiment of FIG. 5. In FIG. 6, inspection region 52 is covered by a transparent sleeve 62. In this version, the transparent sleeve remains in position after the cover halves have been removed. However, the user is able to visually discern damaged or broken fibers through the transparent sleeve. The region of transparency may be a smaller window within a larger sleeve. The use of such a transparent region could be adopted to different portions of the anchor or jacket as well.

Figure 7:
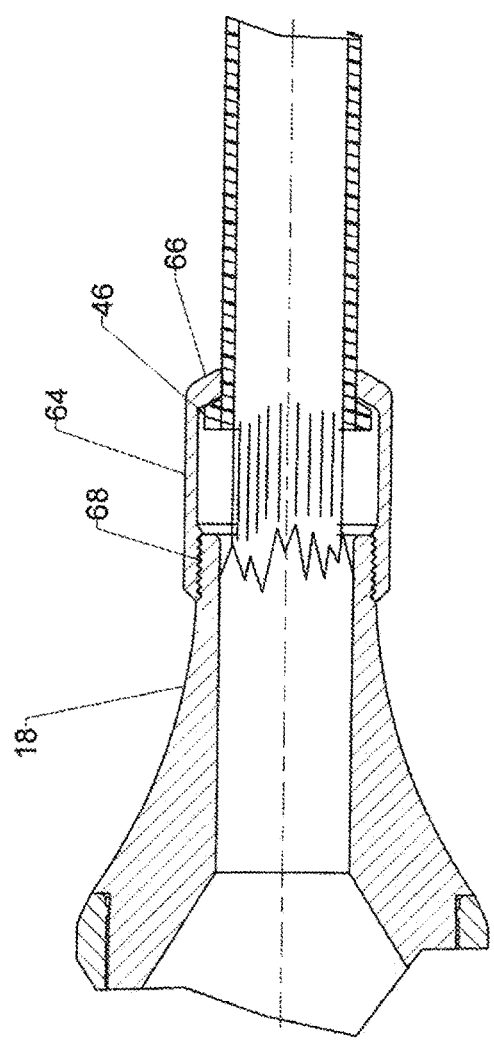
FIG. 7 is a sectional elevation view, showing still another embodiment of the present invention.
Figure 8:
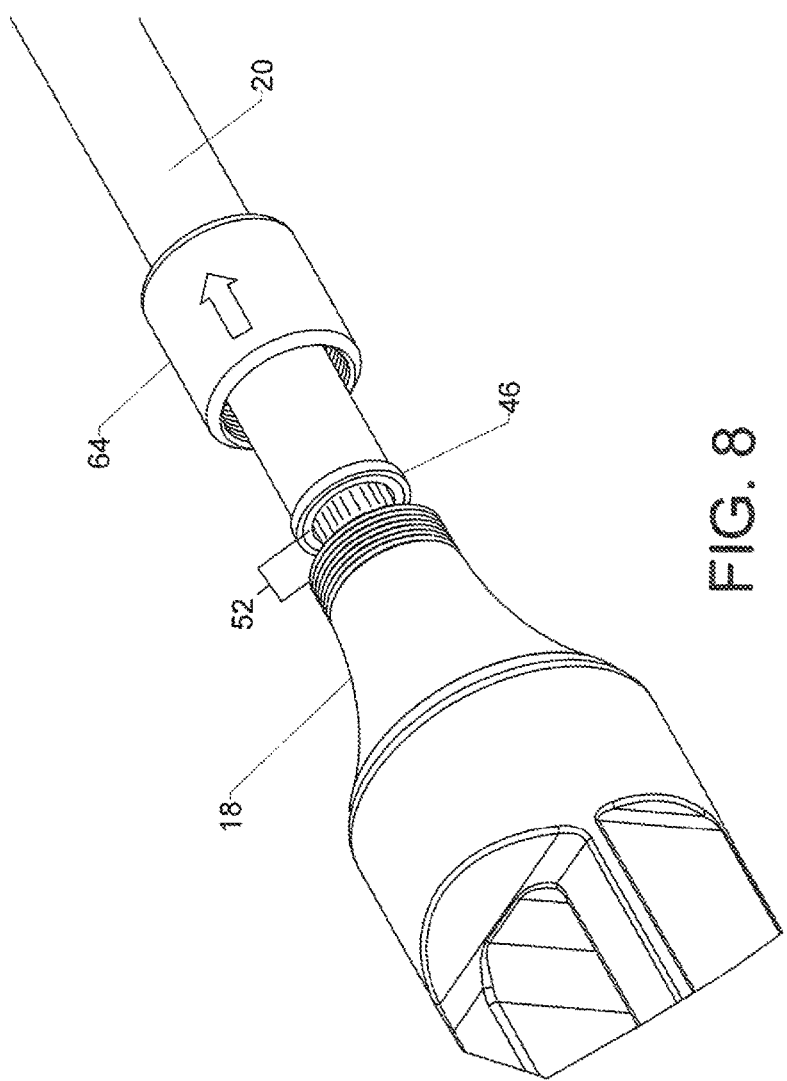
FIG. 8 is a perspective view, showing the embodiment of FIG. 7.

FIGS. 7 and 8 disclose an additional embodiment that uses a different approach to attaching and removing the cover. Threaded cover 64 is a sleeve that selectively connects to anchor 18 via threaded engagement 68. The distal end of the threaded cover includes shoulder 66, which is sized to bear against jacket ring 46. When the user wishes to inspect the inspection region, he or she grasps threaded cover 64 and unscrews it. Once the threaded engagement is released the user is able to slide the threaded cover down the jacket.

This type of cover provides good access to a useful inspection point. Stress is generally concentrated in the neck region of the anchor. This is true for a potted termination (such as shown) and also for spike-and-cone terminations, other compression devices, and nearly any other form of fixed termination. It is also useful to inspect such a transition region in the case of a spliced thimble where high stresses, abrasion, misalignment, or undesirable fiber-to-fiber slipping may occur.

This action is shown in FIG. 8. Threaded cover 64 is pulled down tensile member 20 in the direction indicated by the arrow. This motion reveals inspection region 52. When the inspection is complete, the user pushes the threaded cover back into engagement with the threads on anchor 18 and tightens it.

Those skilled in the art will appreciate that many other configurations for the inspection regions and covers are possible. The design of these components is dependent on the tension member construction, the location and size of the desired inspection regions, and the level of durability required to manage the unwanted elements.

Figure 9:
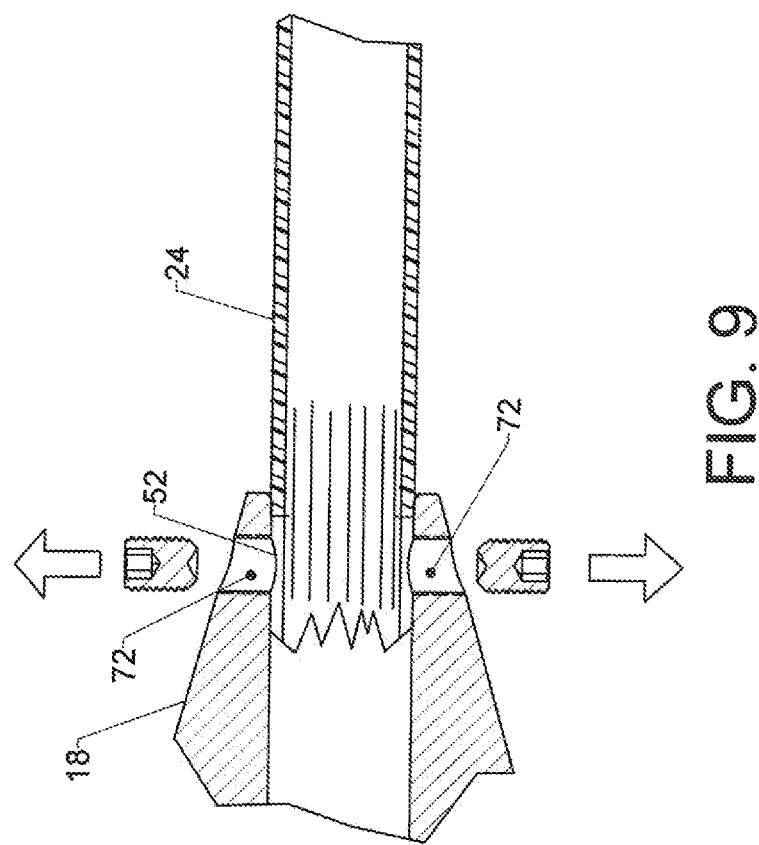
FIG. 9 is a sectional elevation view, showing still another embodiment of the present invention.

FIGS. 9-14 serve to illustrate a few of these possible additional embodiments. FIG. 9 shows an embodiment in which the inspection regions are accessed through the anchor itself. Anchor 18 is provided with one or more access ports 72. Each access port is threaded in order to receive a cover 70 (which is also threaded). When a cover 70 is removed, a user may visually inspect the synthetic fibers in inspection region 52. It is also possible to provide transparent windows in the anchor itself.

The cover in this example could even be an injected volume of curable silicone. The silicone would be injected as a liquid and then cure to form a pliable solid. The resulting flexible plug could be pried out with a screwdriver when inspection is needed. It would then be "replaced" by injecting a new volume of silicone.

As still more examples, the cover could span a large region and be removed by pivoting or sliding. The cover would be "removed" to permit access to the inspection region, yet would remain attached to the balance of the tension member.

Figure 10:
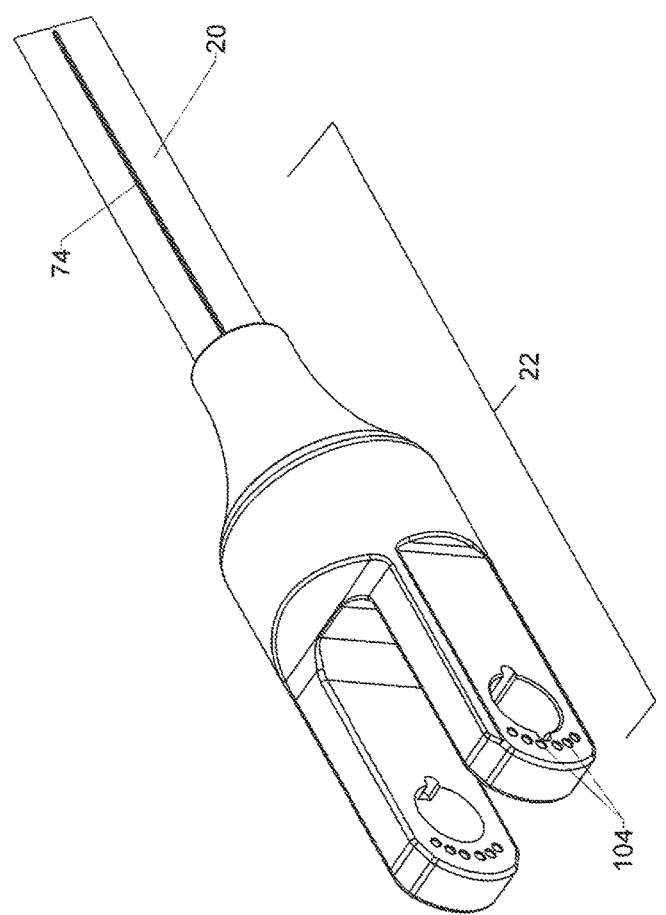
FIG. 10 is a perspective view, showing the use of a alignment marking on a tensile member jacket.
Figure 11:
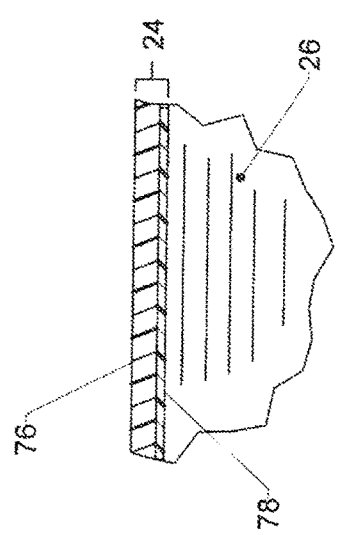
FIG. 11 is a sectional detailed view, showing the use of a jacket having layers with differing colors.

It is preferable to combine other stress-indicating features with the provision of the covered and protected inspection region. FIGS. 10 and 11 illustrate some of these features. FIG. 10 shows a termination 22 that incorporates a clevis joint configured to receive a pin through a transverse hole. Several overload holes 104 are provided in the region of the transverse hole. If a maximum specified tensile load is exceeded, overload holes 104 allow the transverse hole to elongate. This action tends to "clench" the pin that is passing through the hole. The metal will also be visibly deformed. These conditions will alert the user to the fact that the tensile member has been overloaded and should be removed from service.

Also, since the protection tensile member is covered, it may be important to control certain movements that could go unnoticed and that might adversely affect strength. In many synthetic fiber constructions, it is important to ensure that the tension member is not significantly twisted. Alignment marking 74 may be added to the tensile member jacket to show any significant twist. The alignment marking is preferably of a contrasting color—such as a yellow alignment marking on a black background. It may also be desirable to rotationally interlock the jacket and the core of synthetic fibers it contains. An extruded jacket may include a protrusion that extends inward into the core. The protrusion in the extruded profile creates a longitudinal rib that inhibits any rotation of the jacket with respect to the core. Of course, there are many possible alignment markers that could be used continuously or at certain intervals along the tensile member. Even printed text could be used for this purpose.

It is also preferable for the jacket to visually indicate a significant form of wear—such as burns, cuts, scrapes, scuffs, or a full breach. FIG. 11 shows one approach to providing such a feature. Jacket 24 includes two layers— outer layer 76 and inner layer 78. The two layers may be provided in contrasting colors (possibly using different materials). For example, the outer layer may be black while the inner layer is yellow. A scuff that is deep enough to penetrate the outer layer will thereby appear as a yellow streak on the black jacket. The outer layer may also be designed for a certain type of protection (cut resistance) while the inner layer might be designed for a different type of protection (moisture resistance).

Such a multi-layer jacket construction provides a visual "go/no-go" indication for the tensile member assembly. Separate retirement or repair criteria could then be applied to each layer of the jacket.

Figure 12:
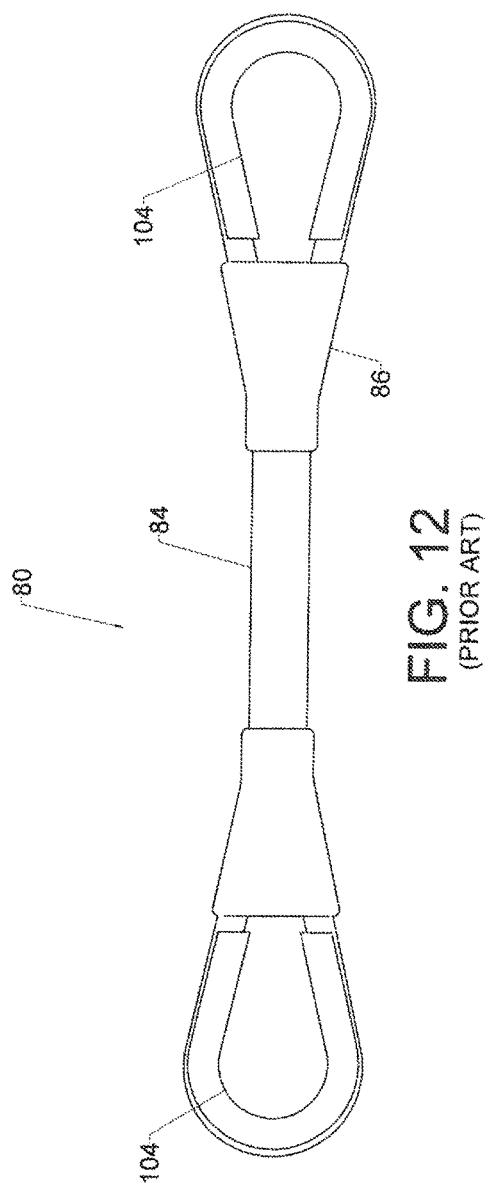
FIG. 12 is an elevation view, showing the application of the present invention to a sling device.
Figure 13:
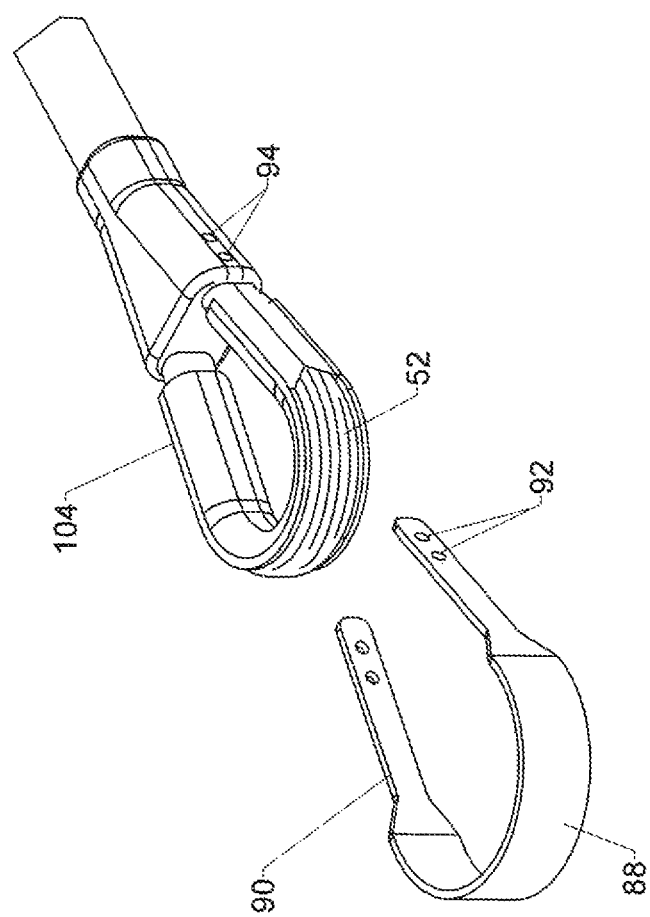
FIG. 13 is an exploded perspective view, showing an inspection region and cover for a sling device.
Figure 14:
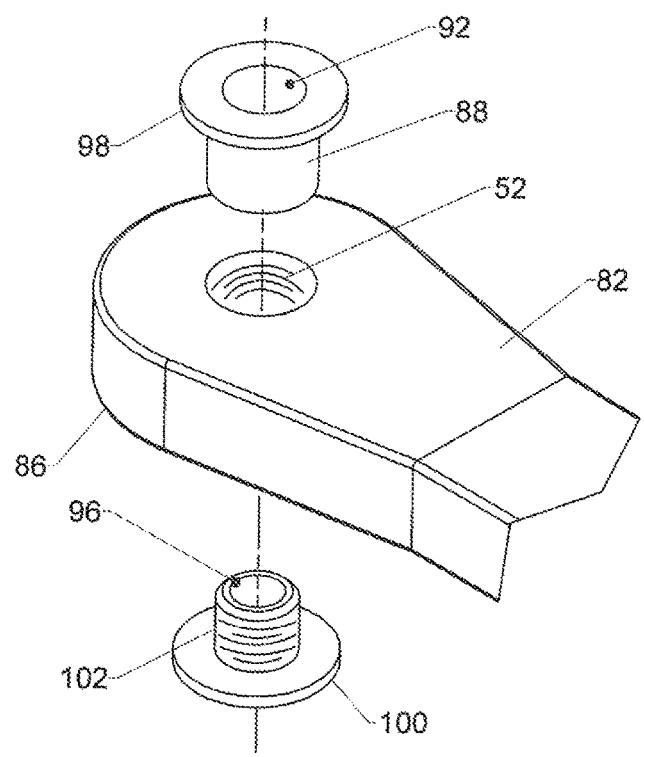
FIG. 14 is an exploded perspective view, showing an alternate embodiment of the inspection region on a sling device.

The preceding embodiments have included terminations where a length of fibers is potted into an anchor. In the field of synthetic tension member, there are of course other types of terminations and the invention is by no means limited to ropes or cables with anchor-based terminations. FIGS. 12-14 provide illustrations of the invention applied to other types of tension members and terminations.

One way to create a termination is to pass a braided rope around a stiff thimble or sheave and then weave it back into itself. A transverse pin is then passed through the thimble or sheave to convey a load. In some cases this may be configured with one tensile leg, and in other cases the synthetic fibers may wrap back around to form a "grommet" (circular configuration) with two or more tensile legs and a fixed termination at each end. In the case where grommets or round slings are used, it is important for purposes of this invention that some form of fixed termination be used. This allows the stress to be controlled and located at a defined point during the use of the tensile member.

FIG. 12 shows still another type of tensile member and termination. In this version a very long fiber or a series of twisted yarns or ropes is passed repeatedly around the two stirrups 82 until a thick bundle is produced. The entire assembly is then sealed into casement 86 (which may be a urethane or a two-part epoxy that is hardened in situ after the assembly is placed in a mold). The result is tension member 84 passing between the two stirrups 86. Such an assembly is thereby entirely sealed, with the end terminations sealed to the center region and a protective jacket covering all the fibers.

FIG. 13 shows the inclusion of an inspection region 52 on the outside portion of a stirrup 82. The inspection region is an opening in the casement that reveals the fibers inside in an area where stresses are concentrated. Cover 88 is selectively placed over the inspection region when no inspection is desired. Cover 88 is secured using strap 90. One or more snaps 92 on strap 90 snap into receiver 94. Of course, many other designs could be used to adequately cover such an arrangement.

Still another approach is shown in an exploded state in FIG. 14. In this embodiment, fibers are wound around or ropes are spliced to two-sheave-type termination bodies. In this example, a transverse hole is provided through casement 86 (The casement is the protective jacket in this case). Inspection region 52 is simply the interior of this transverse hole, where stresses are concentrated. Cover 88 is a cylindrical load-bearing element that passes through the casement and covers inspection region 52. Cover 88 includes first flange 98 that bears against a first side of the casement. Second flange 100 bears against the opposite side of the casement when threaded boss 102 is threaded into a threaded receiver in cover 88. Pin receiver 96 is a smooth cylindrical hole configured to receive a linking pin that attached the stirrup to something else. Of course, many other designs could be used to provide a cover for this type of inspection region.

It is preferable in this example to cover the inspection region with a transparent sleeve (configured to be a close sliding fit for cover 88). The presence of such a transparent sleeve allows the desired visual inspection without allowing the fibers within the inspection region to become disorganized and protrude into the cylindrical cavity needed to receive the cover.

For a spliced rope, terminated round sling, grommet, or fiber-wound sling design, inspection of these inner bearing and sliding elements would be useful. This area, like the entry point into an anchoring or termination body, is a leading stress and wear point.

Figure 15:
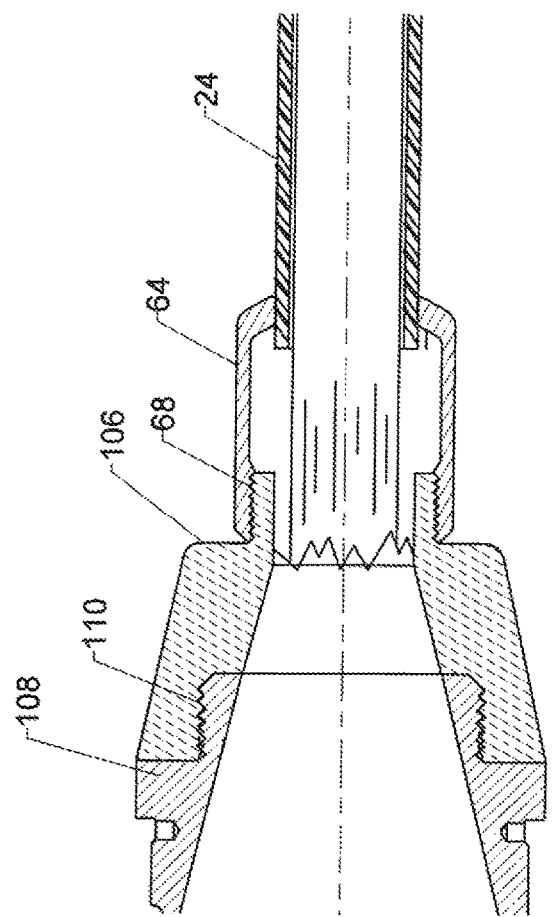
FIG. 15 is a sectional elevation view, showing a termination including two removable covers.

FIG. 15 shows an embodiment in which an enlarged inspection region is provided. In addition, this embodiment includes two separate cover pieces that provide a progressive level of access. Threaded cover 64 is similar to the configuration shown in FIG. 7. However, in this version, the anchor has been split into two pieces—neck anchor portion 106 and distal anchor portion 108. The two anchor portions are selectively engaged via threaded engagement 110.

The user may choose to unscrew threaded cover 64 and thereby gain access to the inspection region it covers. The user may then go further by unscrewing neck anchor portion 106 from distal anchor portion 108. This allows the user to extend the inspection region well into the potted region of the termination (for the case of a potted termination). In the case of a mechanical termination (such as a spike-and-cone) the extended inspection region allows the user to visualize an additional length of fibers. These transitional regions tend to carry high stress concentrations are subject to wear over use. The extended inspection region may only be used some of the time (such as to help ensure the proper initial setup of this region when it is first loaded).

Additional features and variations for the present invention include the following:

1. A version where a substantial portion of the termination or the cable jacket is transparent;

2. A version where the removable cover is a piece of tape, a helical wrapping, a wire wrapping, or a painted layer, and 3. A version where each individual termination on each individual tensile member is gathered into a larger collector of terminations (in order to build a much larger tensile member, for example).

Although the preceding description contains significant detail, it should not be construed as limiting the scope of the invention but rather as providing illustrations of the preferred embodiments of the invention. As an example, the removable covers could assume many different forms and could attach in different ways. Thus, the scope of the present invention should be fixed by the claims rather than the specific examples given.

The invention claimed is:

1. A method for providing and inspecting a durable yet inspectable tensile member assembly including synthetic fibers as a primary tension-carrying element, comprising:
    a. providing a core of synthetic fibers, said core having an end;
    b. attaching a termination to said end of said core, said termination including an anchor with a length of said fibers secured thereto and an anchor exit where said fibers exit said anchor;
    c. wherein said anchor includes an internal passage and said length of said fibers lie within said internal passage, with said fibers being locked into a solidified potting compound, with said anchor completely surrounding said length of said fibers;
- d. providing a jacket surrounding said core and extending along said core to a jacket end, with said jacket lying outside said anchor and said jacket end lying proximate said anchor exit, thereby leaving a gap between said jacket end and said anchor exit;
- e. said core of synthetic fibers being accessible within said gap, said gap thereby comprising an inspection region;
- f. providing a cover configured to selectably cover said inspection region, said cover configured to attach to said anchor and to overlap said jacket so as to cover said inspection region, with said cover covering a first portion of said jacket, with a second portion of said jacket extending outside of said cover; and
- g. moving said cover to permit inspection of said core within said inspection region;
- h. wherein said anchor includes a distal anchor portion and a neck anchor portion that is removable from said distal anchor portion;
- i. wherein a length of said core of synthetic fibers lies within said neck anchor portion; and
- j. moving said neck anchor portion to permit inspection of said length of said core within said neck anchor portion.

2. The method for providing and inspecting a durable yet inspectable tensile member assembly as recited in claim 1, wherein:
- a. said cover is attached to said anchor by a first mechanical interlock; and
- b. a second mechanical interlock exists between said cover and said jacket.

3. The method for providing and inspecting a durable yet inspectable tensile member assembly as recited in claim 2, wherein said cover includes two separable parts configured to clamp over said anchor, said inspection region, and said jacket end.

4. The method for providing and inspecting a durable yet inspectable tensile member assembly as recited in claim 3, wherein:
- a. said anchor includes an anchor ring;
- b. said jacket includes a jacket ring proximate said jacket end;
- c. said cover includes an anchor ring receiver configured to receive and engage said anchor ring on said anchor;
- d. said cover includes a jacket ring receiver configured to receive and engage said jacket ring;
- e. an engagement between said anchor ring receiver and said anchor ring comprises said first mechanical interlock; and
- f. an engagement between said jacket ring receiver and said jacket ring comprises said second mechanical interlock.

5. The method for providing and inspecting a durable yet inspectable tensile member assembly as recited in claim 2, wherein said gap is covered by a transparent sleeve.

6. The method for providing and inspecting a durable yet inspectable tensile member assembly as recited in claim 2, wherein said cover is a sleeve that is selectively connected to said anchor by a threaded engagement.

7. The method for providing and inspecting a durable yet inspectable tensile member assembly as recited in claim 6, wherein:
- a. said jacket end includes a jacket ring; and
- b. said cover includes a shoulder configured to bear against said jacket ring on said first jacket end.

8. The method for providing and inspecting a durable yet inspectable tensile member assembly as recited in claim 7, wherein said threaded engagement is configured to urge said jacket ring toward said anchor as said threaded engagement is tightened.

9. The method for providing a durable yet inspectable tensile member assembly as recited in claim 3, wherein said two separable parts of said cover are clamped in position by transverse bolts.

10. The method for providing and inspecting a durable yet inspectable tensile member assembly as recited in claim 1, wherein said jacket includes multiple layers having contrasting colors.

11. A method for providing and inspecting a durable yet inspectable tensile member assembly including synthetic fibers as a primary tension-carrying element, comprising:
- a. providing a core of synthetic fibers, said core having an end;
- b. attaching a termination to said end of said core, said termination including an anchor with a length of said fibers secured within a passage inside said anchor, said length of fibers being locked into a solidified potting compound, and an anchor exit where said fibers exit said anchor;
- c. wherein said length of said fibers lying inside said anchor is completely surrounded by said anchor;
- d. providing a jacket surrounding said core and extending along a length of said core to a jacket end, with said jacket lying outside said anchor and said jacket end lying proximate said anchor exit, thereby leaving a gap between said jacket end and said anchor exit;
- e. said core of synthetic fibers being accessible within said gap, said gap thereby comprising an inspection region;
- f. providing a cover configured to selectably cover said inspection region, said cover configured to attach to said anchor and to extend over said inspection region and over a first portion of said jacket, with a second portion of said jacket extending outside of said cover;
- g. moving said cover to expose said inspection region and thereby permit inspection of said core within said inspection region;
- h. wherein said anchor includes a distal anchor portion and a neck anchor portion that is removable from said distal anchor portion;
- i. wherein said jacket stops short of said neck anchor portion;
- j. wherein a length of said core of synthetic fibers lies within said neck anchor portion; and
- k. moving said neck anchor portion to permit inspection of said core within said neck anchor portion.

12. The method for providing and inspecting a durable yet inspectable tensile member assembly as recited in claim 11, wherein:
- a. said cover is attached to said anchor by a first mechanical interlock; and
- b. a second mechanical interlock exists between said cover and said jacket.

13. The method for providing and inspecting a durable yet inspectable tensile member assembly as recited in claim 12, wherein said cover includes two separable parts configured to clamp over said anchor, said inspection region, and said jacket end.

14. The method for providing and inspecting a durable yet inspectable tensile member assembly as recited in claim 13, wherein:
- a. said anchor includes an anchor ring;
- b. said jacket includes a jacket ring proximate said jacket end;

c. said cover includes an anchor ring receiver configured to receive and engage said anchor ring on said anchor;
d. said cover includes a jacket ring receiver configured to receive and engage said jacket ring;
e. an engagement between said anchor ring receiver and said anchor ring comprises said first mechanical interlock; and
f. an engagement between said jacket ring receiver and said jacket ring comprises said second mechanical interlock.

* * * * *